United States Patent

[11] 3,597,628

[72] Inventors Richard L. Gowan
 Coronado;
 Lewis E. Adsit, San Diego, both of, Calif.
[21] Appl. No. 870,824
[22] Filed Oct. 21, 1969
[23] Division of Ser. No. 648,547, June 22, 1967
[45] Patented Aug. 3, 1971
[73] Assignee The United States of America as
 represented by the Secretary of the Navy

[54] PULSE ISOLATION AND MEASURING
 1 Claim, 12 Drawing Figs.
[52] U.S. Cl. ................................................. 307/231,
 307/208, 307/221, 307/234, 307/269, 328/63
[51] Int. Cl. .................................................... H03k 5/18
[50] Field of Search ......................................... 307/221,
 224, 231, 208, 269, 234; 328/48, 63

[56] References Cited
UNITED STATES PATENTS
3,225,301 12/1965 McCann ...................... 307/208 X
3,290,606 12/1966 Rodner ........................ 307/269 X
3,471,790 10/1969 Kaps ............................ 307/269 X Primary Examiner—Donald D. Forrer
Assistant Examiner—R. C. Woodbridge
Attorneys—R. C. Sciascia, G. J. Rubens and T. M. Phillips ABSTRACT: As prime equipment, such as radio, radar, sonar, computer and control equipment becomes more complex, the probability of failure increases. This disclosure is directed to a system for rapidly monitoring the quality of the signal at numerous test points throughout the equipment. In the interest of reliability, each signal parameter at each test point is converted to a pulse the duration of which is a measure of the parameter. These pulses are each transmitted to a centrally located general purpose computer where each is measured by a high frequency oscillator, gate, and counter.

INVENTORS
RICHARD L. GOWAN
LEWIS E. ADSIT
BY

ATTORNEYS

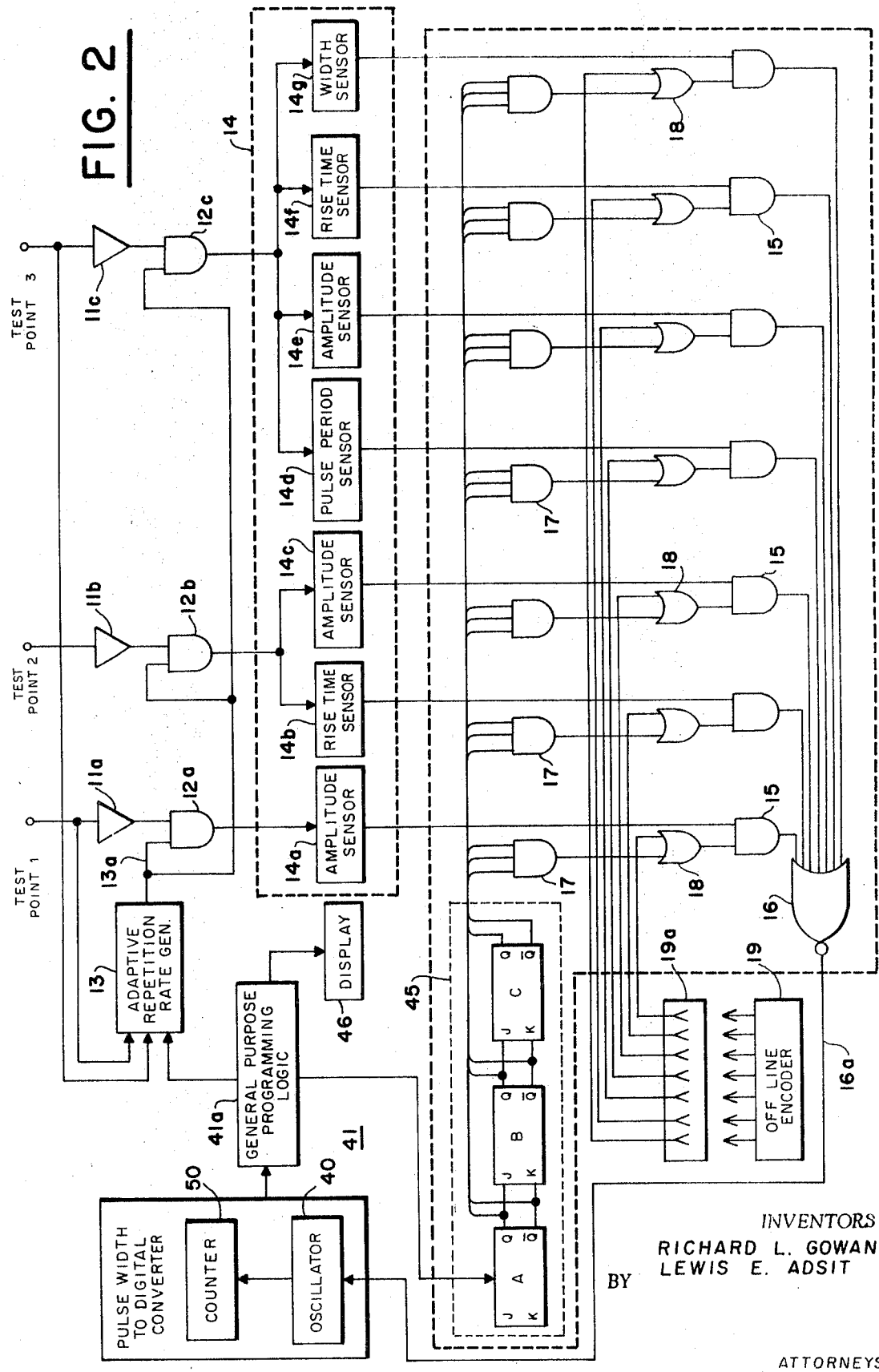

PULSE ISOLATION AND MEASURING

This is a division of application Ser. No. 648,547, filed June 22, 1967.

BACKGROUND

Because of the large number of components in many electrical installations, the rate of failures and the amount of downtime is alarmingly high. The mere addition of test equipment to the prime equipment has reached the point of diminishing return because of the increased failure probability of the test gear. Accordingly, an object of this invention is to provide improved electrical test equipment.

The requisite of reliable test equipment is to not only pinpoint faults but to anticipate failure. Rapid or gradual deterioration of components or subassemblies, such as voltage sources or signal generators, usually proceeds stoppage and is evidenced by changes of relative values of readings at test points throughout the equipment. According, a further object of this invention is to provide means for repeatedly reading and continuously comparing test point values throughout the prime equipment.

The objects of this invention are attained by sequentially examining the signals at the test points converting the parameter of interest of each signal to a pulse the duration of which is proportional is the magnitude of the parameter, and measuring the length of each pulse by a counting technique. Now, in digital form, the parameter information can be stored, compared, and displayed and out-of-limits values or trends toward out-of-limits values can be detected.

Other objects and features of this invention will become apparent to those skilled in the art by referring to specific embodiments described in the following specification and shown in the accompanying drawing in which:

FIG. 2 shows a block diagram of the test system of this invention for plural test points and embodying the principles of FIG. 1;

Figure 1:
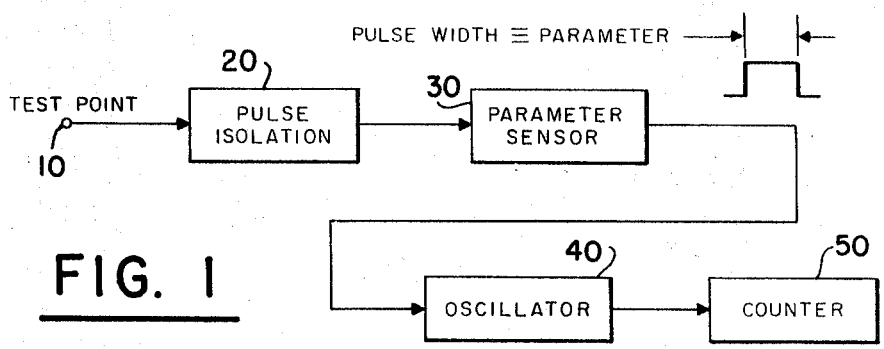
FIG. 1 is an information flow diagram for the voltage to be tested from one test point.

The automatic test system contemplated here is of the type which can continuously monitor many test points, essentially unlimited in number, in prime equipment as complex as that found, may, in a computer control centerboard a warship. Heretofore, the downtime of such complex equipment has been aggravated by the time required to locate the fault, little or no attention being given to the problem of watching the principal voltages and anticipating failure. For a better understanding of the philosophy of the system of this invention a single test point is shown in FIG. 1 with the principle steps involved in reading out the voltage at that point. Where the test voltage is cycle as in a pulse or alternating current system, it is first necessary to isolate a single pulse or cycle from a series.

The pulse isolation circuit 20 is connected to the test point 10. The particular parameter of the isolated signal, such as the amplitude, rise time, fall time or duration is sensed at parameter sensor 30. The characteristic feature of the sensor is that it produces a pulse at the output, the width of which is proportional to the parameter of the signal being measured. Once generated, the pulse can undergo much alternation, amplification and distortion, and may be transmitted considerable distances without losing the important width information. The measured pulse is transmitted to a center general purpose computer, preferably, containing an oscillator 40. The binary voltages of the pulse can be employed to turn the oscillator on and off or can be otherwise employed to gate the output of the oscillator into the counter 50. If now, the frequency of the oscillator is fixed and is known, the counter number at 50 is a direct reading of the parameter measured by the sensor at 20.

Figure 3:
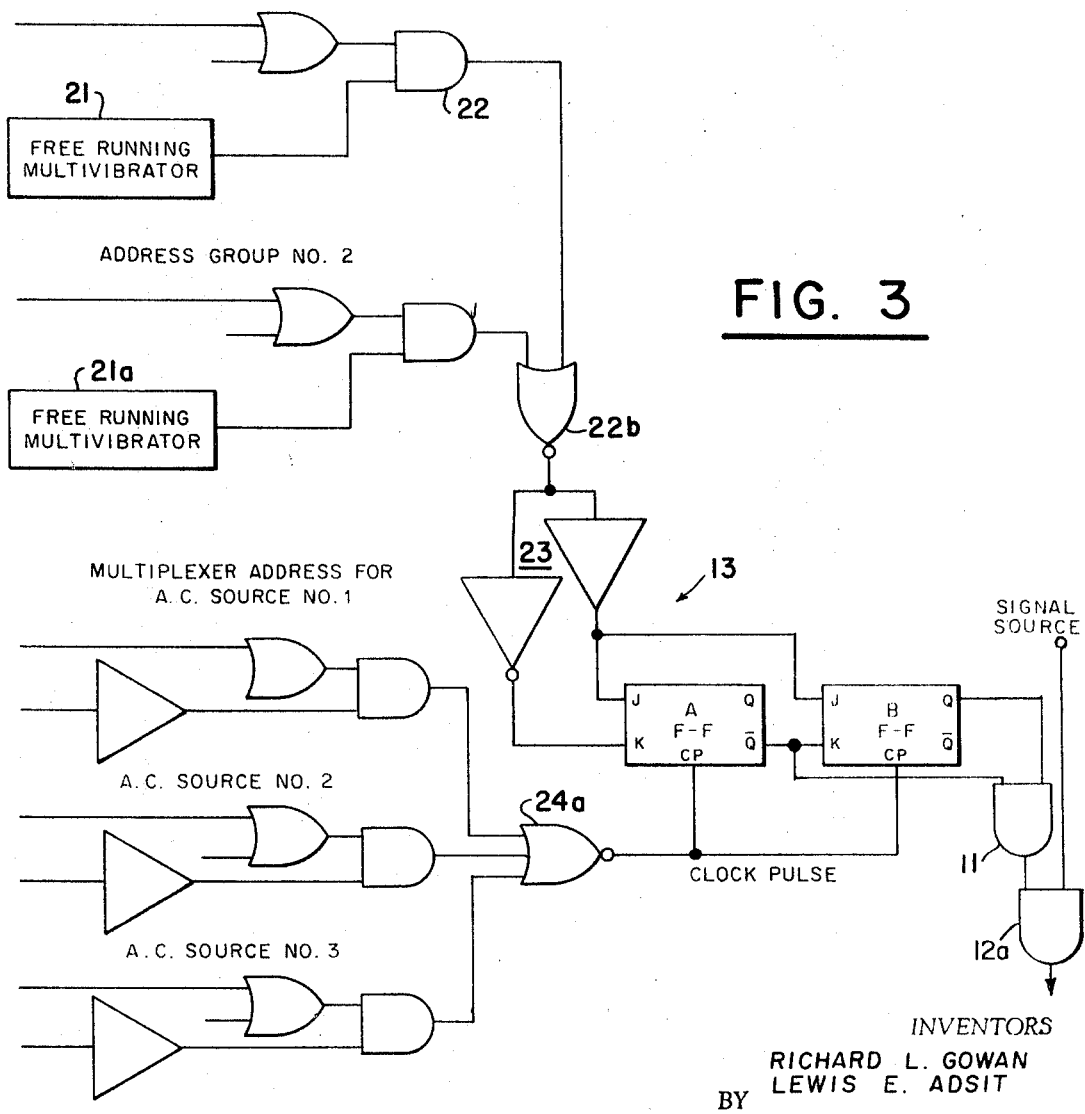
FIG. 3 shows the logical circuits for one embodiment of the adaptive repetition rate generator of the system of FIG. 2.

The system shown in FIG. 2 embodies the features of FIG. 1 but with multiplexing circuits for rapidly sampling in rapid succession the signals at plural test points. By the simple process of normalizing the parameters of each signal, it is easy to display the values side-by-side and to detect a parameter which tends to move towards upper or lower limits. A change in the width or slope of a signal pulse may, for example, suggest a decay in a power supply voltage. For purposes of illustration three test points are shown in FIG. 2, the generality of this disclosure being served by illustrating three test point only. Preferably amplifiers 11 are connected directly to each test point and preferably the input impedance of each amplifier is high in the interest of reduced impedance of each amplifier is high in the interest of reduced signal circuit loading. It will be assumed in FIG. 2 that pulse-type signals only are to be tested. At the output of the amplifiers are connected AND gates 12. The second or enabling input of each AND gate is connected to an output circuit of the adaptive repetition rate generator 13. The purpose of the rate generator 13 is to enable the appropriate gate 12a, 12b or 12c to pass a single pulse out from among the series of pulses at test point an appropriate sensor at 14. One adaptive rep rate generator is shown in FIG. 3 and be described hereinafter.

Let it be assumed that, in FIG. 2, the amplitude of the signal at test point 1 is of interest. To this end the amplitude sensor 14a is connected to the output of AND gate 12a. It will be assumed that both amplitude and rise time of the leading edge of the pulse at test point 2 are to be measured. Sensors 14b and 14c are connected to the output of AND gate 12b. However, in the case of test point 3 four parameters are of interest, namely, pulse period or frequency, amplitude, rise time and pulse width for which sensors 14d, 14e, 14f, and 14g are connected in multiple to the output of AND gate 12c. It is important that the output of each sensor 14 is a binary pulse the duration of which is proportional to the parameter of interest.

The pulse output of the sensors 14 must pass through, respectively, the gates 15. Gates 15 are enabled successively in any desired order. Each gated pulse is transmitted to the computer 41 which for convenience here will be considered to have the programming capabilities of a general purpose computer. When the computer is located a considerable distance from the sensors, it may be desirable to transmit the signal pulses over a single transmission line 16a connected to the output of OR gate 16.

In the embodiment shown each pulse the length of which is proportional to the parameter measured, is applied to the oscillator 40, which will generate a predetermined frequency for the duration of the applied pulse. The number of oscillations at the output of the oscillations at the output of the oscillator 40 are counted in the counter 42. This count displayed by display device 46 then is representative of the magnitude of the desired measured parameter.

Preferably, the display device is of the type which can simultaneously show all of the parameters of the sensors 14. If the parameter magnitudes are all adjusted by appropriate amplification or attenuation to a common value, and are all displayed on a cathode ray screen, a mere glance at the screen will show whether any particular parameter has deviated from normal.

The programming portion of the computer is designed by the rectangle 41a. In essence the logic of the programming circuits can determine the completion of the oscillator count for one readout, and can generate a stepping voltage which is applied both to the adaptive repetition rate generator 13 as well as to the binary-to-decimal encoder 45. The particular encoder shown comprises three cascaded flip-flop stages, A, B, and C, each flip-flop has complimentary output terminals, Q and $\bar{Q}$. The Q and $\bar{Q}$ or logical one and zero voltages are applied in various combinations to the input terminals of the decoding AND gates 17. The required seven addresses are within the capacity of the three binary stages, remembering that $2^3=8$. The particular AND gate 17 addressed by the encoder puts out an enabling pulse which, through OR gate 18, are applied to enabling input terminal of AND gate 15.

According to an important feature of this invention, the automatic encoding of the addresses for the readout may by bypassed or overridden by an off-line address encoder. The off-line encoder 19 may comprises simply a series of toggle switches which can be plugged into the socket 19a. An enabling voltage derived by the off-line encoder is applied through the appropriate OR gate 18 to the AND gate 15 which passes a signal voltage suspected of being in error. Desirably, a socket 19a can be provided at different prime equipment centers and the off-line encoder can be portable. Also portable may be provided an oscillator and counter similar to elements 40 and 42, which can be plugged into the output of gates 15 or 16 for the convenience of service personnel.

Figure 4:
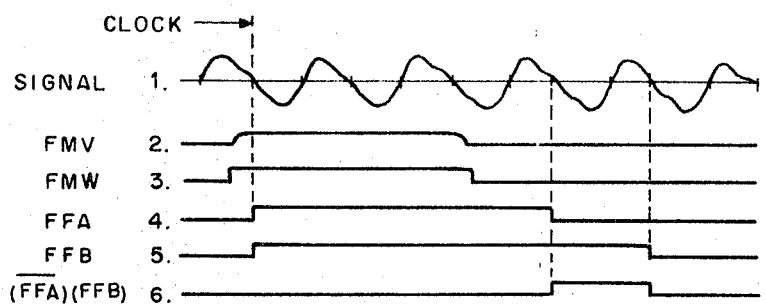
FIGS. 4 and 4A shows typical wave forms and principal binary voltages of the adaptive generator of FIG. 3.
Figure 4A:
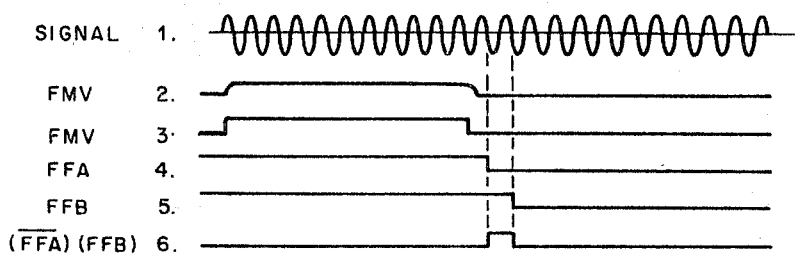

If FIG. 3 is shown an adaptive repetition rate generator 13 particularly adapted to isolate a single pulse from any one of the series of pulses appearing at the test point 1, 2, or 3. The signal source, which may be selected from anyone of the test points, is connected to the signal circuit of gate 12a. The problem is to enable the gate during one cycle only of the input signal. The signal is assumed to be cyclic and to be either alternating current or of the pulse type. In FIGS. 4 and 4A show, respectively, alternating current signals of low and high frequency. The signals shown are sinusoidal, although cyclic waves of any shape are contemplated. According to an important feature of this invention, these signal frequencies are employed directly as the clock frequencies of the logical circuits for isolating the desired single cycle. Flip-flops A and B in FIG. 3 may be of the commercially obtainable types known as the J-K flip-flop having set and reset input terminals J and K and the clock pulse input terminal CP. The output terminal of each flip-flop has complementary "0" and "1" voltages at Q and $\bar{Q}$. The output of one of the free running multivibrator 21 is selected by a multiplex address for a group of related signals and is connected through AND gate 22, OR gate 22b, and phase splitter devices 23 to the set and reset terminals J and K of the A flip-flop. The J terminals of both flip flops are paralleled. As suggested on line 2 of FIG. 4, the frequency of the multivibrator is considerably lower than the signal frequency to be examined. If a group of much higher signal frequency is encountered, it may be desireable to use a second free running multivibrator 21a, which can be selectively substituted, by address signals, for multivibrator 21, to optimize the rate at which the logic circuits operate. The clock pulses for the CP terminals of the flip-flops are obtained directly from the signal source of interest. Any one of the signal sources, controlled by address signals, may be gated through AND gate 24 and OR gate 24a to the CP terminals of the flip-flops. Preferably, a sharp clock impulses is obtained from the logic circuits, such as the gates 24, which can be designed to produce a distinct spike at the crossover point of the AC wave. It is understood that the signal to be tested may be of any wave shape, and as will appear below, DC signals may be monitored.

The logic equations for flip-flop A and flip-flop B are;

$J_a = FMV$  $j_b = FMV$
$k_a = \overline{FMV}$  $k_b = \overline{FFA}$

From these equations, and referring to FIG. 4, it can be seen that one clock pulse after FMV becomes 1, both FFA and FFB will be true. One clock pulse after FMV goes false, FFA will be false. FFB will, however, remain true for one more clock pulse period since its K side equation is $k_b = \overline{FFA}$. That is, Q of FFA is connected directly of K of FFB. Upon the arrival of the next clock pulse after FFA goes false, FFB also goes false. It can be seen from waveforms 4, 5, and 6 of FIGS. 4 and 4A that by "ANDing" the outputs of FFA and FFB in AND gate 11, a gate voltage, (FFA) (FFB) is derived that is true for one complete clock pulse period. This gate voltage is applied to the control terminal of gate 12a to gate out of the signal system the single cycle of any periodic function. The important feature of FIG. 3 is that the clock pulse is derived from the periodic function one cycle of which is to be isolated. The higher frequency of FIG. 4A and the shorter signal cycle requires the correspondingly shorter gate voltage as shown.

Figure 5:
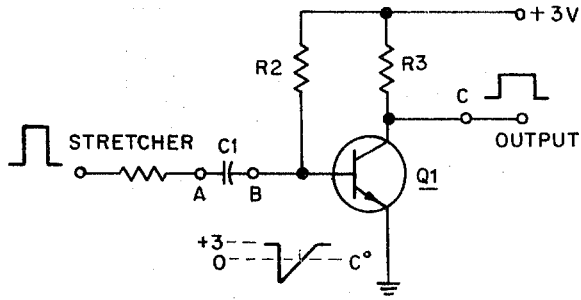
FIG. 5 shows a circuit diagram for a signal sensor and signal parameter-to-pulse width converter, according to this invention.

In FIG. 5 is shown a "stretcher" circuit which is common, according to this invention, to the sensing circuit for the various signal parameters such as amplitude, width, rise time, and fall time and for generating an amplified pulse the width of which is proportional to the parameter of interest. Although the stretcher circuit of FIG. 5 appears in some respects to resemble a normal transistor single stage NPN amplifier, by properly selecting values of R2 and C1 an RC network is formed which converts any positive-going pulse applied to the input to the positive gate voltage of measured length at the output. The duration of the gate voltage, for a given condenser charge, is determined by the RC time constant and the input impedance of the pulse source. More specifically, a positive pulse applied to the input of the stretcher circuit causes point A to swing rapidly positive. Since Q1 is normally conducting and point B at the opposite plate of the capacitor has little effect on the voltage at the output point C until the input voltage drops toward cut off which is ground potential in the example of FIG. 5. The rapid fall of the input pulse toward ground causes a corresponding negative drop at point B and Q1 is cut off and the output at point C rises to near the supply voltage which in this case is shown as 3 volts. Point B having to discharge back through R2 produces a sawtoothed type of discharge and the output at C is essentially a square wave until the conduction of Q1 is reached. When this point is reached, the transistor again becomes saturated and point C drops rapidly to ground potential. Thus, a waveform such as shown for point C is produced. The sloop of the ramp of the sawtooth depends mainly on the RC network of C1 and R2, while the length of the sides of the triangle including the ramp depends on the magnitude of the charge fed into the condenser C1. The duration of the output pulse in turn determines the length of time the oscillator 40, FIG. 2, operates and the count that is built up in counter 42.

Figure 6:
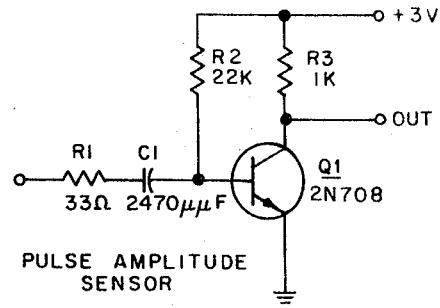
FIG. 6 shows a circuit diagram similar to the circuit of FIG. 5 but with specific values for measuring signal pulse amplitude.

FIG. 5 is repeated in FIG. 6 but with specific values for generating an output pulse the duration of which is a measure of the amplitude of the signal at the input. The operation is basically the same as in FIG. 5 but C1 and R2 are of comparatively low values to make the circuit insensitive to the width of the pulse being monitored. Although the output gain is low, the input pulse width may change from 50 to 1000 microseconds without causing appreciable change in output, thus making FIG. 6 a true amplitude-to-width converter. For an input signal amplitude varying from 0.2 to 8 volts, the output pulse duration varied, substantially linearly, from 5 to 76 milliseconds. Resistor R1 is used to isolate the sensor from the prime equipment.

Figure 7:
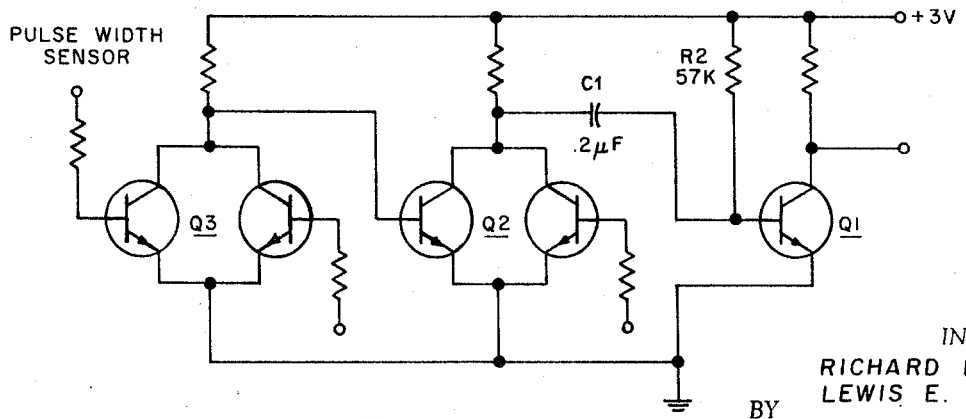
FIG. 7 shows a circuit diagram of a sensor for measuring signal pulse width.

In the pulse width converter of FIG. 7, the RC time constant of R2C1 must be made insensitive to amplitude changes. To this end, double inversion of the input signal in the two differential amplifiers Q2 and Q3 effectively clip or reduces all pulses to a common amplitude equal in this case to about the supply voltage of plus 3 volts. That is, the two differential amplifiers drive charge condenser C1 with a common amplitude of about 3 volts, so that the charge in condenser 1 is essentially a function only of input pulse width.

Figure 8:
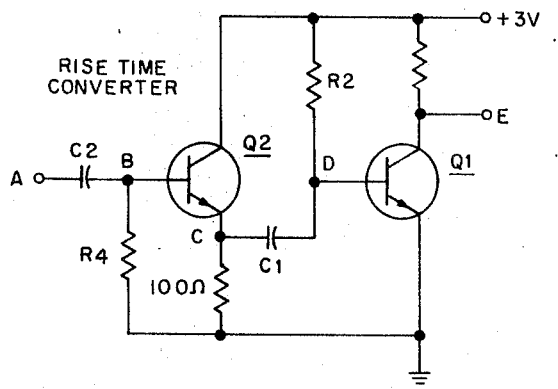
FIG. 8 shows the diagram of a circuit for measuring rise time of a wave front.
Figure 9:
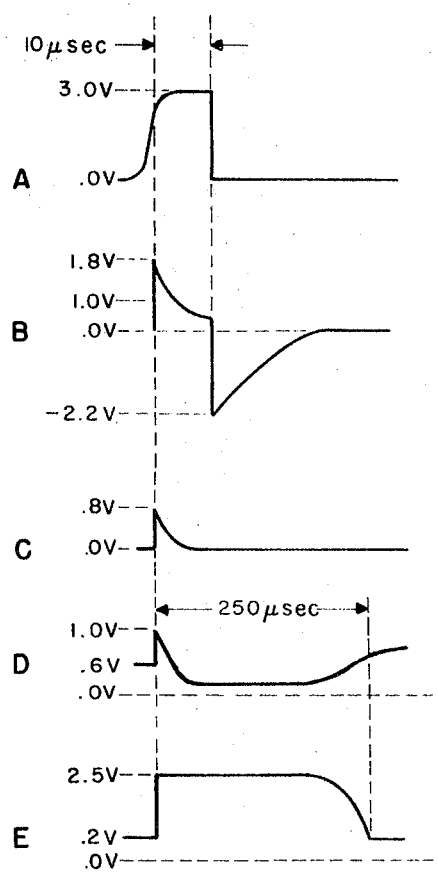
FIG. 9 shows the examples of wave forms encountered at points A, B, C, D, and E in the circuits of FIG. 8.

A rise time converter is shown in FIG. 8. Here the stretcher circuit R2C1 is preceded by a differentiating circuit consisting of condenser C2 and R4 coupled in the input of amplifier Q2. Only the positive-going spike of the differentiating circuit is employed. This circuit is not amplitude limited and is not affected by pulse width but is instead dependent on rise time as a determinant of the amplitude of the positive spike created at the left hand terminal of condenser C1. In FIG. 9 is shown the voltage wave forms at points A, B, C, D, and E of FIG. 8. At point A, referring to FIGS. 8 and 9, the pulse to be monitored is certain to have a wave front that is hot vertical. The amplitude of the differentiated positive portion of the signal voltage at point B is proportional to the steepness of the wave front at A of interest. The voltage supply and the polarity of amplifier Q2 are so chosen as to eliminate the negative portion of the differentiated signal. Desirably, low output impedance is provided for the time constant circuit R2C1. To this end the 100 ohm load resistor between point C and ground is provided. As shown in FIG. 9 the voltage spike provided at point C causes the opposite plate of the condenser at point D to swing positively which is ineffective in the amplifier Q1. The following swing in a negative direction of point D causes cutoff for marked reduction in current through Q1 and produces the substantially square wave at output terminal E, the duration of which is controlled by the amount of time required to permit Q1 to resume saturation conduction.

Figure 10:
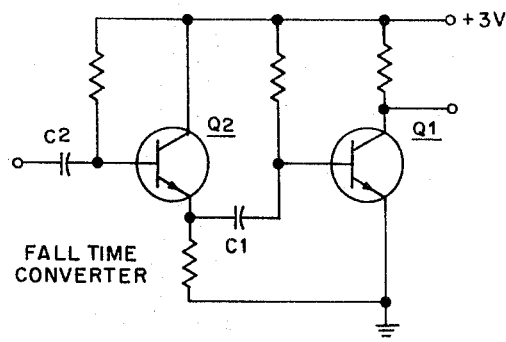
FIG. 10 shows the diagram of a circuit for measuring fall time of a wave front.

The fall time converter shown in FIG. 10 is similar to the rise time converter of FIG. 8 in that it combines the use of the stretcher circuit of FIG. 5 and the differentiating circuit of FIG. 8. In FIG. 10, however, the differentiating circuit is returned to the positive bias voltage which is plus 3 volts in the example considered. The differentiating amplifier Q2 for the differentiating circuit is, significantly, of the PNP type as distinguished from the NPN type employed in FIG. 8. The PNP transistor produces the necessary spike from the negative-going trailing edge of the monitored pulse. This eliminates the effect of the rise time and a positive portions of the differentiated signal.

Figure 11:
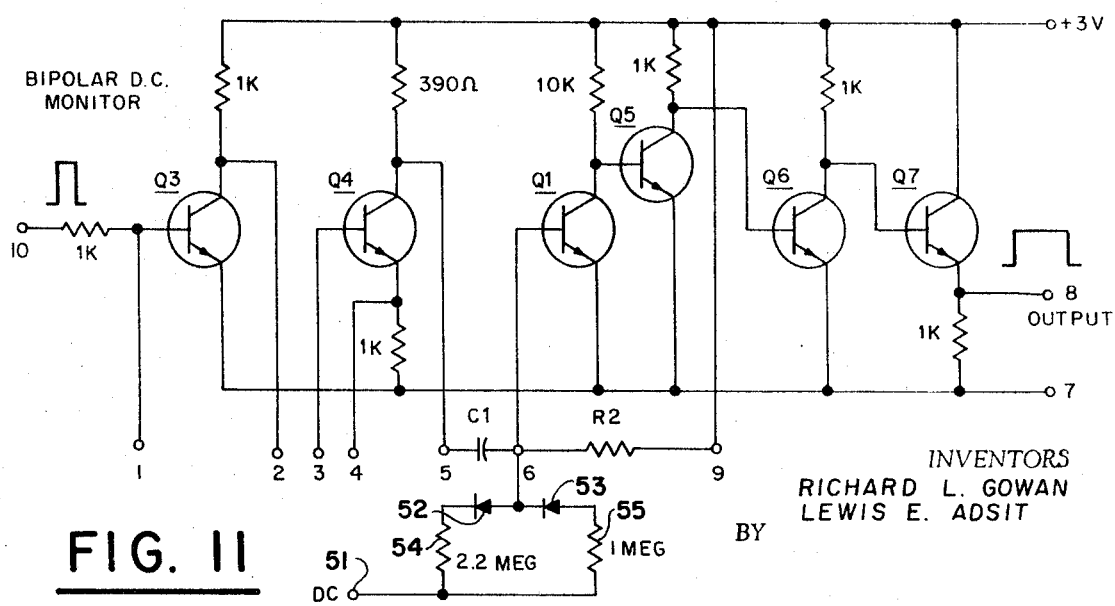
FIG. 11 shows the diagram of a circuit for measuring direct current voltages of either polarity and generating a pulse the width of which is proportional to the voltage.

It will be noted that all of the circuits described up to this point have been adapted for handling cyclic signals such as sinusoids or pulse signals. For an automatic test system to be universal in its application, the system must of course be capable of monitoring direct current voltages of either polarity. In FIG. 11 is shown a bipolar direct current monitoring system.

Significantly, all of the circuits of FIG. 11 can be placed on a single insulating header or "chip" less than one centimeter in diameter. The technique used in the so-called thin film technique in which the circuits and semiconductors are deposited in the vapor phase. The 10 numbered terminals of FIG. 11 are external leads to which can be attached the condensers and resistors for providing the various functions described heretofor in FIGS. 5—10. For the bipolar function, terminal 6 is connected into the input of amplifier Q1 and to the midpoint of the time constant circuit C1R2 as in the other sensor circuits. Terminal 6 is also connected to the unknown direct current voltage of either polarity at terminal 51 through the oppositely polarized diodes 52 and 53 and, respectively, the high resistance resistors 54 and 55. Next, a positive pulse from any source is connected to the input pin 10. Such a pulse can be obtained for example from the adaptive generator 13 of FIG. 2. The amplitude and width of this pulse has no effect on the output gate voltage of the converter provided the amplitude is sufficient to cause saturation of the double invertor stage, Q3 and Q4. The width of the pulse must also be great enough to cause saturation of the RC network C1R2. Using an R2 of about 200,000 ohms and condenser C1 of 2,000 micromicrofarads, width saturation occurs in approximately 3 milliseconds. In operation, the pulse applied at pin 10 functions as a chopper while the direct current voltage to be measured at input terminal 51 establishes the charge on condenser C1 and hence determines the length of time which amplifier Q1 is held in the cutoff condition. The square wave discuss above at the output of Q1 is amplified in Q5, Q6, and Q7 and appears as a square wave at output pin 8. It will now appear that the circuits of this invention can be employed to measure all of the common signal parameters and that prime equipment can easily be retrofitted with the miniature headers thus suggested in FIG. 11.

What we claim is:

1. A system for isolating one complete cycle of a continuous alternating current signal, said system comprising;
    a free running multivibrator of an operating frequency relatively low compared to the frequency of said alternating current signal,
    two cascaded flip-flops, each flip-flop having a set, a reset and a clock control circuit, and complementary output terminals,
    the clock control input of each flip-flop being connected to the source of said signal to be isolated, so that change-of-state of said flip-flops occur only in response to said signal to be isolated, and connections between the set and reset terminals of said flip-flops and the output of said multivibrator being such that the voltage at one output terminal of one of said flip-flop persists for a time duration longer than the voltage at one output terminal of the other flip-flop that is equal to the interval between two clock control voltages from said signal,
    an AND gate coupled to the outputs of each of said flip-flops and being responsive to provide a logical 1 only during the interval between two clock control voltages from said signal, and
    a gate with a signal path connected between the source of said alternating current signal and a utilization means, the control circuit of said gate being connected to the output of said AND gate so that only one cycle of said signal will be passed by said gate.